US012791082B2

(12) United States Patent
Herzog

(10) Patent No.: US 12,791,082 B2
(45) Date of Patent: Nov. 10, 2026

(54) METHOD FOR PRODUCING A PRE-ASSEMBLED SUBASSEMBLY

(71) Applicant: Herzog Intertec GmbH, Mahlstetten (DE)

(72) Inventor: Raphael Herzog, Mahlstetten (DE)

(73) Assignee: HERZOG INTERTEC GMBH, Mahlstetten (DE)

( * ) Notice: Subject to any disclaimer, the term of this patent is extended or adjusted under 35 U.S.C. 154(b) by 0 days.

(21) Appl. No.: 18/596,783

(22) Filed: Mar. 6, 2024

(65) Prior Publication Data

US 2024/0301938 A1 Sep. 12, 2024

(30) Foreign Application Priority Data

Mar. 9, 2023 (DE) ........................ 102023105895.9

(51) Int. Cl.
*F16C 43/04* (2006.01)
*F16C 19/28* (2006.01)
*F16F 15/26* (2006.01)

(52) U.S. Cl.
CPC ............ *F16F 15/267* (2013.01); *F16C 19/28* (2013.01); *F16C 43/04* (2013.01); *F16F 2222/08* (2013.01); *F16F 2226/04* (2013.01); *F16F 2230/0011* (2013.01)

(58) Field of Classification Search
CPC .. F16C 2226/50; F16C 2226/70; F16C 43/04; F16F 2226/04; F16F 2226/044
See application file for complete search history.

(56) References Cited

U.S. PATENT DOCUMENTS

2013/0156359 A1* 6/2013 Flender .................. F16C 19/04 384/456
2014/0301683 A1* 10/2014 Higdon ............... F16C 33/4623 384/577

FOREIGN PATENT DOCUMENTS

| | | | |
|---|---|---|---|
| DE | 102011088603 | A1 | 6/2013 |
| DE | 102014202789 | A1 | 10/2014 |
| DE | 102013220558 | A1 | 4/2015 |
| DE | 102014210366 | A1 | 12/2015 |
| EP | 2282080 | A1 | 2/2011 |
| EP | 2010799 | B1 | 9/2013 |
| EP | 2700841 | B1 | 8/2018 |
| EP | 2876318 | B1 | 9/2019 |
| JP | 2012057747 | A | 3/2012 |
| WO | 2008133437 | A1 | 11/2008 |
| WO | 2008151724 | A1 | 12/2008 |

* cited by examiner

*Primary Examiner* — Christopher J. Besler
(74) *Attorney, Agent, or Firm* — KRIEGSMAN & KRIEGSMAN

(57) ABSTRACT

Method for installation in a balancing shaft (12) with at least one bearing (13, 14) having a needle roller and cage assembly (15) rolling on the bearing (13, 14), is assembled with a slotted needle roller and cage assembly (22), which is opened for mounting on the bearing (13, 14) of the balancing shaft (12), and is placed in the radial direction, to engage around the bearing (13, 14), and is closed after engaging around the bearing (13, 14).

7 Claims, 3 Drawing Sheets

METHOD FOR PRODUCING A PRE-ASSEMBLED SUBASSEMBLY

This application claims priority of German Application No. 10 2023 105 895.9 filed Mar. 9, 2023, which is incorporated herein by reference in its entirety.

The invention relates to a method for producing a pre-assembled subassembly for installation in an engine, comprising a balancing shaft with at least one bearing and a needle roller and cage assembly rolling on the bearing.

EP 2 010 799 B1 discloses a balancing shaft with at least one unbalanced weight portion and with at least one bearing, wherein the at least one unbalanced weight portion is associated with the bearing. The bearing has a radial running surface which extends only partially over a periphery of the bearing. The radial running surface is limited by free end areas at the bearing. A centrifugal force resulting from the rotation of the balancing shaft lies within an area of the bearing which is formed by the running surface extending partially over the periphery of the bearing. The bearing has a depression when viewed in cross-section in the longitudinal direction of the balancing shaft.

DE 10 2014 210 366 A1 discloses a position arrangement with a shaft and a needle bearing or needle roller and cage assembly. The shaft comprises at least one bearing, on the periphery of which the needle roller and cage assembly rolls. This needle roller and cage assembly is slotted. A lock on the needle roller and cage assembly is opened to mount it on the shaft or bearing. A cage of the needle roller and cage assembly is then spread open, insofar as this is permissible. The expanded needle roller and cage assembly is then positioned in an axial direction to a bearing at the end of the shaft. The axis of rotation of the needle roller and cage assembly is aligned with or coaxial to the axis of rotation of the shaft. The expanded needle cage of the needle roller and cage assembly is then pushed over the shaft in an axial direction until the expanded cage of the needle roller and cage assembly is positioned in relation to the bearing. The lock of the needle roller and cage assembly is then clipped in. A pre-assembled position arrangement is then available, which can be installed in the motor.

The disadvantage of this bearing arrangement is that the design freedom with regard to the bearing position and the neighboring unbalanced weight portions is limited. This is due to the fact that the needle cage of the needle roller and cage assembly can only be spread to a predetermined extent and therefore exposes an inner periphery for pushing the needle roller and cage assembly onto the shaft, which determines and restricts the shaft geometry.

The invention is based on the task of proposing a method for producing a pre-assembled subassembly for installation in an engine, consisting of a balancing shaft with at least one bearing and a needle roller and cage assembly rolling on the bearing, by means of which greater design freedom is possible for the balancing shafts.

This object is solved by a method for producing a pre-assembled subassembly for installation in an engine, wherein the subassembly comprises a balancing shaft with at least one unbalanced weight portion and at least one bearing, and the at least one unbalanced weight portion is associated with the bearing and the bearing has a radial running surface which extends only partially over a periphery of the bearing and a centrifugal force resulting upon rotation of the balancing shaft lies within a region of the bearing, which is formed by the running surface extending partially over the periphery of the bearing and the bearing has a depression when viewed in cross-section with respect to the longitudinal direction of the balancing shaft, in which the needle cage with an open lock is moved in the radial direction towards the bearing and placed in the radial direction and then positioned so as to surround the bearing. The lock of the needle roller and cage assembly is closed after the needle roller and cage assembly is engaging the bearing.

Due to this radial mounting of the needle roller and cage assembly on the partial bearing of the balancing shaft, it is no longer necessary for the needle roller and cage assembly or a spread needle cage of the needle roller and cage assembly to be pushed along the longitudinal axis of the balancing shaft, starting from an end area of the balancing shaft up to the bearing. This results in significantly greater design freedom in the design of the balancing shaft, as the areas adjacent to the bearing in the axial direction and the areas adjacent to this bearing are no longer limited to an outer periphery that is determined by the free inner diameter of an expanded needle cage. This in turn enables a weight- and/or volume-optimized shaft design.

Furthermore, it is preferable for the needle cage to be placed on the bearing in a radial direction in a first assembly step, so that one end region of the running surface is positioned on the partial bearing between the locking elements of the lock. In this first assembly step, the needle cage is pre-positioned in a radial direction to the bearing position.

In a further assembly step, it is advantageously provided that the one closing member positioned in the region between the end regions of the bearing and/or in the depression of the bearing is held in this region while a rotary movement of the needle cage is initiated. By positioning the closing member in the depression of the bearing or between the two end regions of the partial bearing, the closing member can be pre-fixed so that the needle roller and cage assembly virtually rotates around this pre-fixed closing member during the subsequent rotary movement. This can make assembly easier.

The needle cage is preferably rotated in the one further assembly step until the closing member provided outside the depression of the bearing is guided around the running surface of the bearing. The opened needle cage then engages around the bearing position.

In a final assembly step, it is preferable to connect the locking elements of the lock to each other so that the needle cage is closed. This can be done by clipping, for example.

The assembly of the needle roller and cage assembly in the radial direction to the balancing shaft can be made easier if the needle cage is spread in the radial direction to the bearing and positioned so that it surrounds an end area of the bearing.

It is preferable that the running surface of the bearing is offset radially inwards in relation to an outer circumferential surface of the unbalanced weight portion, so that a transition is formed between the running surface and the outer circumferential surface of the unbalanced weight portion, which is preferably designed as an end face. The end faces preferably have a sickle-shape. This has the advantage that the running surface can be limited with respect to its axial direction of extension.

Furthermore, it is preferably provided that the needle roller and cage assembly is guided in the axial direction during assembly on the bearing by the opposing end faces, which are preferably aligned in the axial direction. This simplifies and speeds up assembly.

The needle roller and cage assembly is preferably mounted on the bearing in the radial direction if an enveloping circle of the outer circumferential surface of the unbalanced weight portion is larger than an inner diameter of an expanded needle cage of the needle roller and cage assembly. With such a dimensioning of the needle roller and cage assembly on the one hand and of the unbalanced weight portion on the other hand, this mounting in the radial direction is particularly preferred.

This pre-assembled assembly can comprise both a single-row and a double-row needle roller and cage assembly.

The invention and other advantageous embodiments and further embodiments thereof are described and explained in more detail below with reference to the examples shown in the drawings. The features to be taken from the description and the drawings can be used individually or in any combination in accordance with the invention. It shows:

FIG. 1 a perspective view of a pre-assembled module,

FIG. 2 a schematic side view of a bearing with a needle roller and cage assembly of the assembly according to FIG. 1, FIG. 3 a schematic sectional view along line A-A as shown in FIG. 2, FIG. 4 a perspective view of a balancing shaft and a needle roller and cage assembly at the start of a first assembly step, FIG. 5 a schematic sectional view of a further assembly step, FIG. 6 a schematic sectional view of a subsequent assembly section of

FIG. 5,

FIG. 7 a schematic sectional view of an assembly step following FIG. 6, and FIG. 8 a schematic sectional view of the needle roller and cage assembly mounted on the bearing of the balancing shaft.

FIG. 1 shows the perspective of a pre-assembled module 11. This pre-assembled assembly 11 is intended for a multi-cylinder engine, for example, and is used to balance second-order inertia forces. Usually, two pre-assembled assemblies are arranged offset to each other, which then rotate in opposite directions at twice the engine speed.

The pre-assembled assembly 11 comprises a balancing shaft 12, which has at least one bearing 13, 14. In the embodiment example, the balancing shaft 12 comprises two bearings 13, 14. A needle roller and cage assembly 15 is mounted at each bearing 13, 14. These bearings 13, 14 with the needle roller and cage assemblies 15 mounted thereon serve to support the balancing shaft 12 in an engine block.

At a rear end section 16 of the balancing shaft 12 shown in FIG. 1, a drive not shown in detail, such as a chain drive or a gear drive, is provided which drives the balancing shaft 12.

An unbalanced weight portion 18, 19 is provided on one or both sides adjacent to the bearing 14. These are preferably provided symmetrically to the first and second bearings 13, 14. These unbalanced weight portions 18, 19 can be arranged centrally to an axis of rotation 21 of the balancing shaft 12.

The unbalanced weight portions 18, 19 have an outer circumferential surface 20 which extends only partially in the radial direction. Preferably, this outer circumferential surface 20 of the respective unbalanced weight portion 18, 19 extends at an angle of less than 270°, preferably by 180° or less. This configuration is also dependent on the inertia forces to be balanced.

The first and second bearings 13, 14 have a running surface 22 extending partially over the periphery of the bearing 13, 14. This running surface 22 extends at a circumferential angle of, for example, 30-350°. Preferably, the running surface 22 extends at a circumferential angle of 180-220°. An end region 23 is formed at the respective end of the running surface 22. This end region 23 can be rounded, for example. Alternatively, the end region 23 can also be formed by a flattening or by a bevel.

Figure 1:
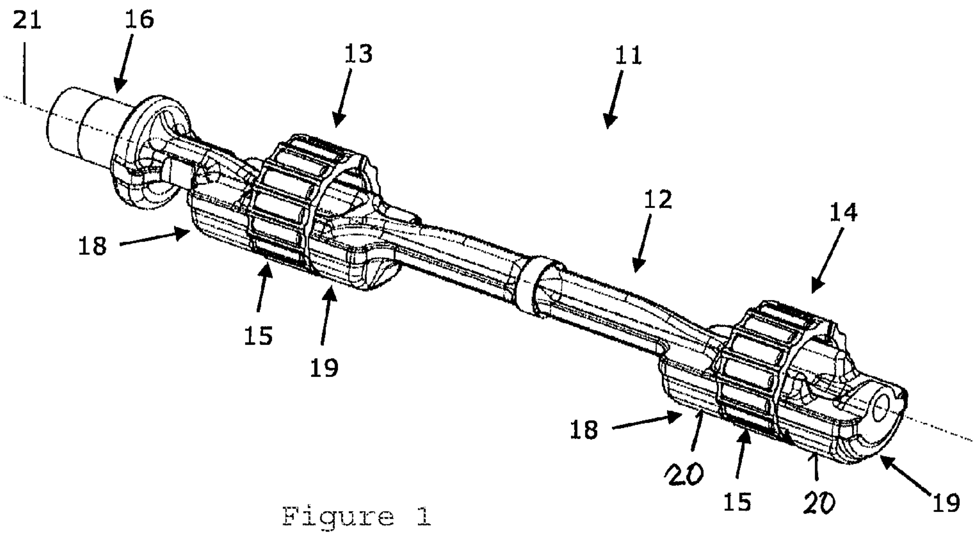
Figure 2:
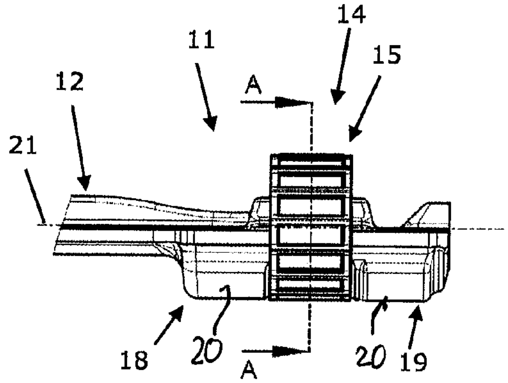
FIG. 2 shows a schematic side view of the needle roller and cage assembly 15 mounted on the bearing 14.
Figure 3:
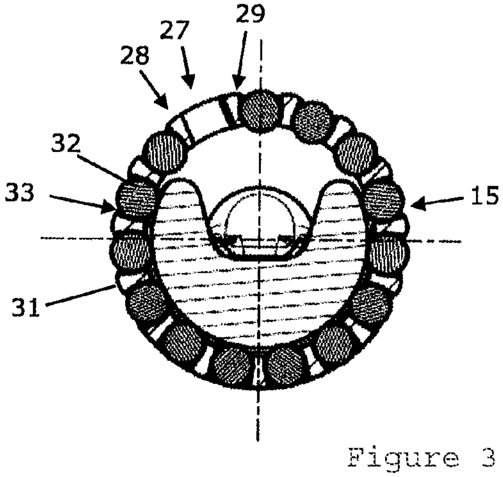
FIG. 3 shows a schematic sectional view along line A-A in FIG. 2. This sectional view shows the positioning of the needle roller and cage assembly 15 in relation to the bearing 13, 14.

The bearing 13, 14 has a depression 24 in the cross-section shown in FIG. 3. This depression 24 can be pot-shaped or trough-shaped. Other geometric designs are also possible. This depression 24 is preferably limited by the two end regions 23 arranged adjacent to each other. The end regions 23 form a transition between the running surface 22 and the depression 24. The depression 24 is preferably designed in such a way that the deepest point of the depression 24 is below the axis of rotation 21 of the balancing shaft 12 as shown in the sectional view in FIG. 3. This allows weight optimization to be achieved.

The needle roller and cage assembly 15 is designed as a slotted needle roller and cage assembly 15. This needle roller and cage assembly 15 comprises a lock 27 with two closing members 28, 29, which are detachably connected to one another. Preferably, these closing members 28, 29 are clipped together. The needle roller and cage assembly 15 advantageously comprises a needle cage 31, which can be made of plastic, for example. Several needle pockets 33 are provided in the needle cage 31. A needle roller 32 is rotatably mounted in each needle pocket 33. The running surface 22 of the bearing 13, 14 preferably has a precise, in particular ground, surface. In a transition region between the running surface 22 and the adjacent unbalanced weight portion 18, 19, a depression or a insertion can be provided. The needle roller and cage assembly 15 can be guided by the unbalanced weight portions 18, 19 in the axial direction or along the axis of rotation 21 of the balancing shaft 12 secured to the bearing 13, 14.

Figure 4:
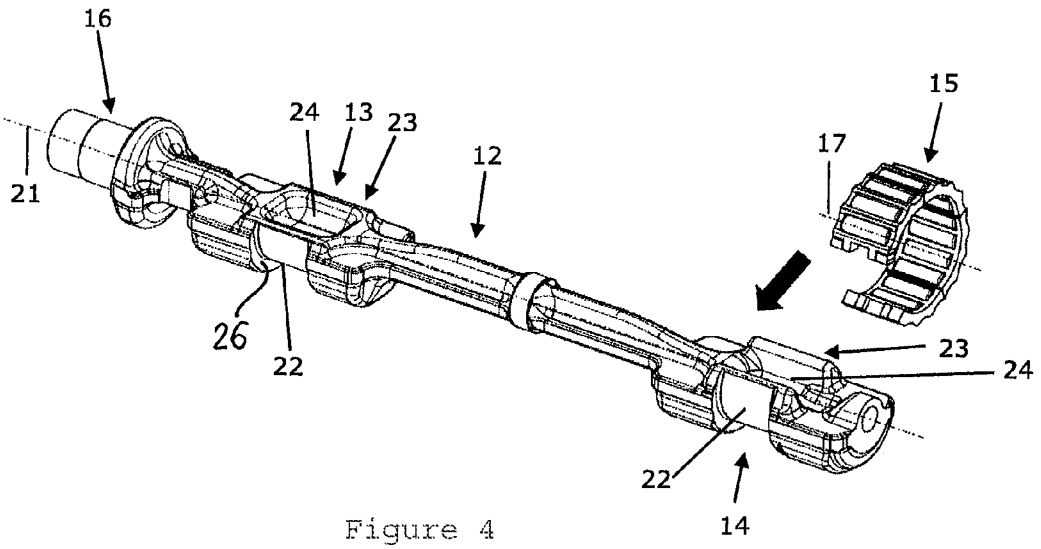

FIG. 4 shows the balancing shaft 12 before the needle roller and cage assembly 15 is mounted. The balancing shaft 12 comprises the running surface 22, which is radially inwardly offset relative to an outer circumferential surface 20 of the at least one unbalanced weight portion 18, 19, preferably relative to the two unbalanced weight portions 18, 19 adjoining the bearing 13, 14. An enveloping circle of the outer circumferential surface 20 of the unbalanced weight portions 18, 19 is larger than a circumferential circle of the bearing 13, 14, which is formed by the running surface 22. An end face 26 is formed in a transition region between the running surface 22 and the outer circumferential surface 20 of the unbalanced weight portion 18, 19. This end face 26 is preferably sickle-shaped. These end faces 26 can limit the width or the axial direction of extension of the running surface 22. A recess or an insertion in the form of a groove may also be provided in a transition region between the running surface 22 and the end face 26.

FIGS. 4 to 8 show the method for producing the pre-assembled assembly 11 for installation in a motor, subdivided into individual assembly steps. In this method, the needle roller and cage assembly 15 is fed in a radial direction to the partial bearing 13, 14 of the balancing shaft 12 and mounted in a radial direction on the bearing 13, 14. The lock 27 of the needle roller and cage assembly 15 is opened.

Advantageously, the needle cage 31 is at least slightly spread open. The needle roller and cage assembly 15 is then aligned with its axis of rotation 17 essentially parallel to the axis of rotation 21 of the balancing shaft 12. The needle roller and cage assembly 15 is then moved in a radial direction towards the bearing 13, 14 on which the needle roller and cage assembly 15 is to be mounted.

Figure 5:
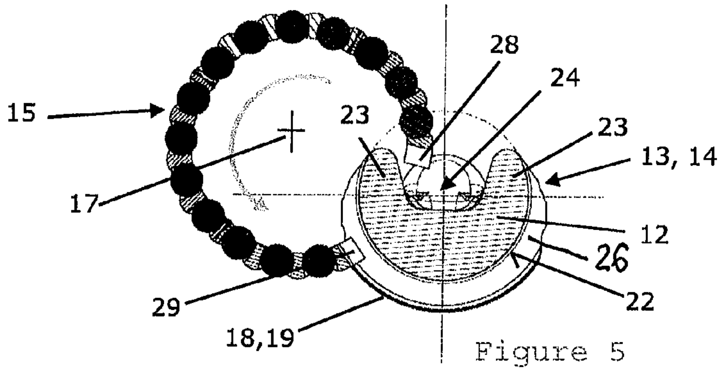
Figure 6:
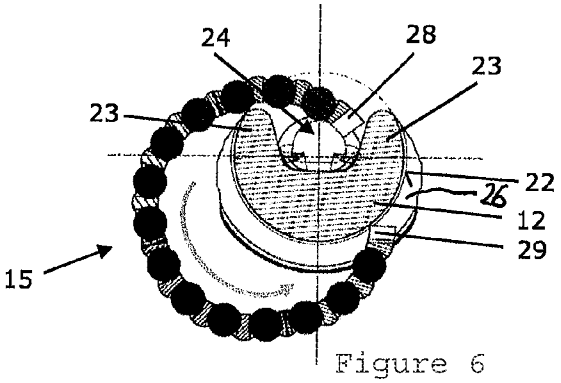

A first engagement position of the needle roller and cage assembly 15 at the bearing 13, 14 is shown in a sectional view in FIG. 5. An end region 23 of the bearing 14 is positioned between the closing members 28, 29 of the lock 27. The needle roller and cage assembly 15 was thus fed to the bearing 14 in such a way that one closing member 28 engages between the two end regions 23 or in the depression 24 of the bearing 13, 14 and the other closing member 29 is aligned with the running surface 22 of the bearing 14.

Starting from the positioning of the needle roller and cage assembly 15 to the bearing 14 according to FIG. 5, a rotary movement of the needle roller and cage assembly 15 about its axis of rotation 17 and/or a push-on movement is initiated after the first positioning, so that the closing member 29 is positioned along the running surface 22 beyond the end area 23. As a result, the needle roller and cage assembly 15 is pushed onto the bearing 13, 14. The axis of rotation 17 of the needle roller and cage assembly 15 is moved towards the axis of rotation 21 of the balancing shaft 12 while it is being pushed on. During this rotational movement or rotary movement, the closing member 28 positioned in the depression 24 can assume various positions, but the closing member 28 remains within the depression 24 or between the two end regions 23 of the bearing 13, 14 until the end of the push-on movement.

When positioning the needle cage 31 in a first engagement position at the bearing 13, 14 until the needle roller and cage assembly 15 is fully positioned onto the running surface 22, the needle cage 31 can be guided through the end faces 26. This secures the assembly in the axial direction and can be simplified.

Figure 7:
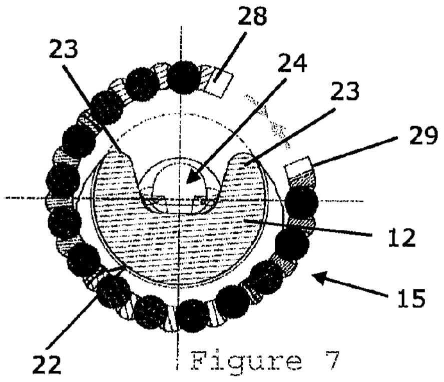
Figure 8:
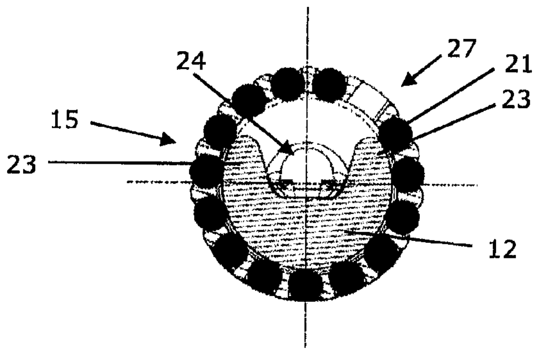

After the needle roller and cage assembly 15 has been fully pushed onto the running surface 22 of the bearing 13, 14, a part of the needle roller and cage assembly 15 rests against the running surface 22. The closing members 28, 29 can be positioned freely and outside the running surface 22 in the bearing 13, 14, as shown in FIG. 7.

In this arrangement, it is possible for the lock 27 of the needle roller and cage assembly 15 to be closed. The needle roller and cage assembly 15 closed by the lock 27 is mounted and secured to the running surface 22 of the bearing position 13, 14. Due to the periphery of the running surface 22 of the bearing 13, 14 by more than 180°, the needle roller and cage assembly 15 is held in a rolling position relative to the bearing 14.

Once the needle roller and cage assembly 15 has been fitted to the bearing 13, 14, the needle roller and cage assembly 15 can also be guided in the axial direction by the end faces 26.

Alternatively, it may be provided that the running surface 22 of the bearing 13, 14 extends over a circumferential angle of less than 180°. In addition, in this embodiment it may be provided that at least one support surface is provided opposite the running surface 22, which is located on the same periphery as the running surface 22 of the same bearing 13, 14. Depressions 24 can also be formed on one or both sides between the support surface and the bearing surface 22. An analogous assembly of the needle roller and cage assembly 15 as shown in FIGS. 4 to 8 is also possible. Such an embodiment of the balancing shaft with at least one supporting surface is known from WO 2008/151724 A1.

The invention claimed is:

1. Method for producing a preassembled subassembly for installation in a motor, comprising a balancing shaft with at least one bearing and a needle roller and cage assembly rolling on the at least one bearing, wherein the balancing shaft comprises at least one unbalanced weight portion and the at least one bearing, wherein the at least one unbalanced weight portion is associated with the bearing and the bearing has a radial running surface which extends only partially over a periphery of the bearing and the radial running surface is limited by free end regions of the bearing, wherein a centrifugal force resulting upon rotation of the balancing shaft is situated within a region of the bearing which is formed by the running surface extending partially over the periphery of the bearing, the bearing having a depression when viewed in cross-section with respect to the longitudinal direction of the balancing shaft, wherein, the needle roller and cage assembly comprises a slotted needle roller and cage assembly, which comprises a needle cage with a lock, is opened and the needle cage of the needle roller and cage assembly is provided for mounting on the bearing of the balancing shaft, the needle roller and cage assembly with the lock, wherein the lock is opened, is moved in a radial direction towards the bearing and fed spread open in the radial direction onto the bearing so that a first end region of the free end regions of the bearing is positioned between closing members of the lock of the needle roller and cage assembly, wherein the closing members of the lock comprise a recess and a projection that are connectable to one another to close the lock, a first closing member of the closing members is held in position between the end regions of the bearing and/or in the depression of the bearing while a rotary movement of the needle roller and cage assembly is initiated, the needle roller and cage assembly is applied so as to embrace the bearing after it has been fitted, and the lock of the needle roller and cage assembly is closed after engaging around the bearing.

2. Method according to claim 1, wherein the rotary movement of the needle cage is carried out until a second closing member of the closing members of the lock is guided around the running surface of the bearing.

3. Method according to claim 2, wherein the lock of the needle roller and cage assembly is closed after engaging around the bearing by connecting the closing members of the lock.

4. Method according to claim 1, wherein the running surface of the bearing is offset radially inwards with respect to an outer circumferential surface of the unbalanced weight portion, so that an end face is formed in each case in a transition region between the running surface and the outer circumferential surface of the unbalanced weight portion.

5. Method according to claim 4, wherein the needle roller and cage assembly is guided in an axial direction towards the bearing at least during assembly or in the installed position by the end face and a mutually exclusive opposite end face which adjoin the running surface of the bearing.

6. Method according to claim 4, wherein an enveloping circle of the outer circumferential surface of the unbalanced weight portion, which is larger than an inner diameter of an expanded needle cage of the needle roller and cage assembly the assembly is carried out in the radial direction onto the bearing.

7. Method according to claim 1, wherein the needle roller and cage assembly comprises a single-row or a double-row needle roller and cage assembly.

* * * * *